Figures 1, 2:
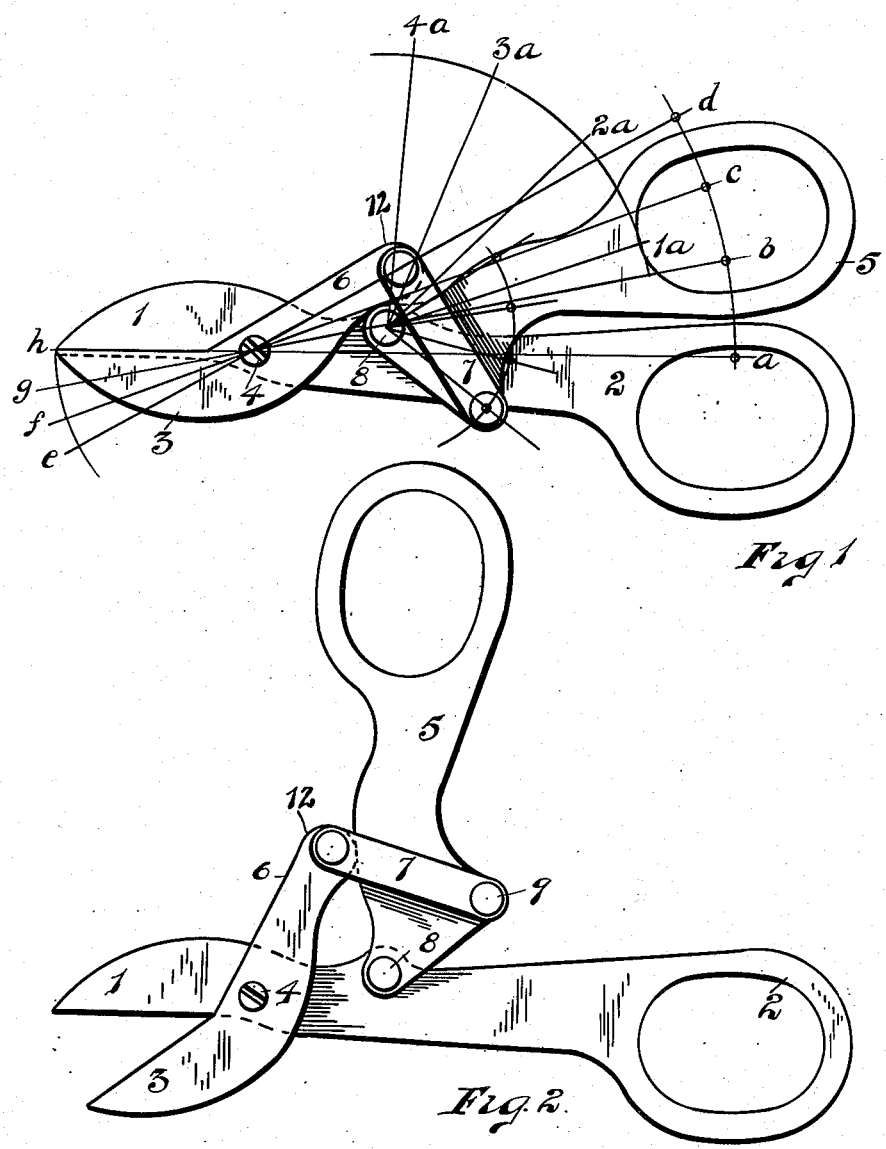

J. R. SEARIGHT.
CUTTING SHEARS.
APPLICATION FILED NOV. 14, 1908.

936,574.

Patented Oct. 12, 1909.

Witnesses
Clarence E. Day
Alecia Townsend

Inventor
John R. Searight
By Parker & Burton
Attorneys

UNITED STATES PATENT OFFICE.

JOHN R. SEARIGHT, OF DETROIT, MICHIGAN, ASSIGNOR TO DETROIT SHEAR COMPANY, OF DETROIT, MICHIGAN.

CUTTING-SHEARS.

936,574.  Specification of Letters Patent.  Patented Oct. 12, 1909.

Application filed November 14, 1908. Serial No. 462,593.

*To all whom it may concern:*

Be it known that I, JOHN R. SEARIGHT, a citizen of the United States, residing at Detroit, county of Wayne, State of Michigan, have invented a certain new and useful Improvement in Cutting-Shears, and declare the following to be a full, clear, and exact description of the same, such as will enable others skilled in the art to which it pertains to make and use the same, reference being had to the accompanying drawings, which form a part of this specification.

This invention relates to cutting shears.

It has for its object an improved shear leverage by means of which the cutting blades are maintained in a condition of substantial equality between the resistance and the force during the closing of the shears from a position of extreme spread to a position of entire closure of the cutting blades. By equality between resistance and force is meant that the effective length of the levers used to close the shear blades varies as the effective length of the layers of the shear blades themselves varies, so that at whatever point the article may be placed between the shear blades, the force necessary to sever the article is substantially the same. The result is effected by the mechanism shown in the drawings, in which:—

Figure 1, shows the side elevation of the shears closed. Fig. 2, shows a side elevation of the shears open.

On Fig. 1 is drawn a diagram indicating the relative angular movement of the cutting blades and of the two handle levers.

The main blade 1 is provided with a handle 2, integral with it. Pivoted to the main blade is the companion blade, 3, which has an extension to the rear of the pivot 4, substantially the same length as the cutting part of the blade 3. Pivoted to the main blade and its handle 1, 2, is a lever 5, which coacts with the blade 3 and its extension to comprise the complement of the second shear blade. The extension 6 of the blade member 3 is connected to the lever 5 by a link 7, which is pivoted to the end of the extension 6, and pivoted to an off-set of the member 5, bringing the link 7 with its pivotal connections to the extension 6 and the member 5, in such a position that the middle point of the link 7 is nearly in line with the centers of the pivot 4 and the pivot 8, when the shear blade is closed, and swinging upward somewhat, in fact enough to bring the pivot 9 which might be called the power end of the lever 7 above the line from 4 to 8, when the shear is in its completely open position.

The first movement in closing from the position shown in Fig. 1, the end 1ª of the lever 5 traverses an arc which is proportionally large to the arc traveled by the end 12 of the blade 3, when this travel is compared with the later movement of the moving parts. As the blade 3 closes against the blade 1, the relative movement in arc of both parts diminishes, but the movement of the shear blade diminishes more rapidly than the movement of the lever member, and the efficient force is increased even to the complete closing point of the shears.

With the shears constructed in accordance with this invention, it is possible to shear metal plates clear at the point, with practically the same ease that the same plate can be sheared at any intermediate place between the point and the heel of the blades.

The diagram drawn on Fig. 1 shows the relative movement of the cutting blade and the handles 2 and 5. The arc $a$—$d$, which equals (in degrees) the arc $e$—$h$, is divided into equal parts. The corresponding arc $1^a$—$4^a$ traversed by the lever 5 is found to increase from $4^a$ to $1^a$, showing that there is produced an increasing effect with the constant force as the shears close; at the same time the resistance travels from the pivot 4 toward the point of the shears, as the blades close upon one another, thus offsetting to a degree the factor of increased force furnished by the movement of the handle portions of the blades, as above described, so that practically constant pressure upon the handle portions 2 and 5 is all that is required throughout their entire closing movement. It is a mathematical problem to so locate the pivots as to produce exact compensation.

What I claim is:—

1. A shear implement, having in combination a main blade, a shear blade pivoted thereto at its center portion, a lever member pivoted to the main blade intermediate its handle portion and the point of pivoting of said shear blade thereto, and a link member pivoted to the rearward end of the shear blade and to a point on said lever member which, when the members are in open position, lies above the axis of the two first mentioned pivots, and which lies below such axis when the members are brought to closed position, substantially as described.

2. A shear implement, having in combination a main blade, a shear blade pivoted thereto, a link member pivoted at one end to the upper end of said shear blade, and a lever member pivoted to said main blade above the point of pivoting of the shear blade thereto, said link member being pivoted to said lever member in such relative position with respect to its point of pivoting to the main blade that this last named pivot point is moved across the axial line passing through the two pivots on the main blade in the closing and opening movements of the implement, substantially as described.

3. A shear implement, having in combination a main blade, a shear blade pivoted thereto, a lever member pivoted to the main blade above the point of pivoting of the shear blade thereto, and a link member pivoted to the end of the shear blade and to a point on the lever such that its power end constituted by this last named point of pivoting traverses the axis of the two points of pivoting on the main blade when the shears are opened or closed, substantially as described.

In testimony whereof, I sign this specification in the presence of two witnesses.

JOHN R. SEARIGHT.

Witnesses:
 CHARLES F. BURTON,
 WILLIAM M. SWAN.